(12) United States Patent
Spiecker

(10) Patent No.: US 7,088,517 B2
(45) Date of Patent: *Aug. 8, 2006

(54) BEAM SPLITTER DEVICE OR LASER-SCANNING MICROSCOPE

(75) Inventor: Heinrich Spiecker, Bielefeld (DE)

(73) Assignee: LaVision Biotec GmbH, Bielefeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/392,058

(22) Filed: Mar. 19, 2003

(65) Prior Publication Data

US 2003/0189757 A1    Oct. 9, 2003

(30) Foreign Application Priority Data

Apr. 5, 2002    (DE)    ................. 102 15 162

(51) Int. Cl.
  *G02B 27/14*    (2006.01)
  *G02B 1/10*    (2006.01)

(52) U.S. Cl. .................. 359/633; 359/636; 359/629; 359/583

(58) Field of Classification Search ............... 359/583, 359/580, 629, 636, 386, 368, 856, 850, 857, 359/865, 618, 638, 639, 838, 839, 861; 372/22
See application file for complete search history.

(56) References Cited

U.S. PATENT DOCUMENTS 6,219,179 B1 *    4/2001    Nielsen et al. ............... 359/386
6,389,043 B1 *    5/2002    Nelte et al. .................. 372/22

FOREIGN PATENT DOCUMENTS

DE    198 30 198    2/1999
DE    199 04 592    9/2000
JP    57-67910    4/1982

* cited by examiner

*Primary Examiner*—Audrey Chang
(74) *Attorney, Agent, or Firm*—Jordan and Hamburg LLP

(57)    ABSTRACT

The subject matter of the invention is a beam splitter device having two spaced apart parallel highly reflecting mirrors, between which there is disposed a semireflecting mirror which is spaced a different distance from the at least one highly reflecting mirror, said semireflecting mirror having at least one portion configured to form a full reflector or an antireflector, the semireflecting mirror being slidably disposed between the highly reflecting mirrors and a laser-scanning microscope as well.

24 Claims, 5 Drawing Sheets

| a) | AR Substrat |
|---|---|
| Pasition | Strahlen |
| 4a-3e | 1;1';2;2';3;3';4;4';5;5';6;6';7;7';8;8' |
| 4a-3d | 5;5';6;6';7;7';8;8' |
| 4a-3c | 5;6';6';6' |
| 4a-3b | 6;6' |
| 4a-3a | 8' |

| b) | AR Substrat |
|---|---|
| Pasition | Strahlen |
| 4b-3a | 8' |
| 4b-3d | 3;6' |
| 4b-3c | 2;3;6;7 |
| 4b-3b | 1;2;3;4';5;6';7;8' |
| 4b-3a | 1;1';2;2';3;3';4;4';5;5';6;6';7;7';8;8' |

BEAM SPLITTER DEVICE OR LASER-SCANNING MICROSCOPE

FIELD OF THE INVENTION

The present invention relates to a beam splitter device having at least two spaced apart parallel highly reflecting mirrors, between which there is disposed a semireflecting mirror which has spaced different distances from it the highly reflecting mirrors.

DESCRIPTION OF THE PRIOR ART

A prior art beam splitter device (DE 199 04 592-C2) generates light beams, laser light beams for example, of the same intensity. Accordingly, if several beams of the same intensity irradiate a specimen, a signal is produced upon single photon excitation or multiphoton excitation which is the same at any location on the specimen on which a partial beam impinges.

With this beam splitter device there is more specifically provided that the actual splitting operation occurs at the semireflecting mirror arranged between the highly reflecting mirrors. One half of the beam is thereby transmitted, the other half is reflected. By means of mirrors, the resulting beam portions are then reflected back to the beam splitting plate, the beam portions impinging a second time on the transflective or semireflecting mirror again doubling their number while reducing their intensity accordingly, the power of each beam being halved at each splitting operation. Two beam bundles, with 1, 2, 4, 8, 16 and so on beams each, can thus be produced, all these beams being inclined to one another at an incremental angle if the highly reflecting mirrors are inclined at the proper angle. By means of a certain optics, the two beam bundles are now superposed to form one beam bundle in which the beams of the two partial bundles alternate. By means of an objective, the beam bundle generates a line of foci focussed in the specimen, said discrete foci being equidistant from one another.

It has been found out that the microscopic specimens on which radiation is applied in the manner allowed for by the beam splitter device described herein above scatter the light. Scattering occurs both upon excitation and upon imaging on a detector or on the first image plane, which is observed by eye. Scattering reduces the image quality because of reduced contrast. Meaning, the portions of the image that are located in immediate proximity to the focus of excitation through the beam directed on the specimen are additionally brightened. In cases of strong scattering though, discrete foci are wanted so that only the light from the focus may be evaluated properly. This means that it makes sense to vary the spacing between the foci for examining certain specimens. This also applies to thick specimens for example. For, with thick specimens, the reduced quality of the focus leads to a reduced signal output, which strongly depends on the power density and, as a result thereof, on the quality of the focus when the excitation is non-linear.

SUMMARY OF THE INVENTION

A beam splitter device in which the spacing of the foci may be increased without too much adjustment or in which the number of foci may be reduced is more specifically characterized in that the semireflecting mirror is provided with at least one portion configured as a full reflector or as an antireflector, the semireflecting mirror being slidably disposed between the highly reflecting mirrors. If such a semireflecting mirror is inserted which is provided with portions that are characterized, in the region of the last splitting operation in particular, by a fully reflecting substrate or by a fully transmitting substrate, the number of beams is halved in such a manner that the length of the focus line is reduced by half. If the semireflecting mirror with the corresponding fully transmitting or fully reflecting portions is introduced further into the beam splitter device as viewed from the last splitting operation, i.e., between the two highly reflecting mirrors, the number of beams is again reduced by half and the length of the focus line is also halved accordingly. This may be performed until only one beam of the bundle remains. The beam intensity thereby increases with the increase being inversely proportional to the decrease in the number of beams.

By contrast, the number of beams within the focus line decreases when the semireflecting mirror with its fully reflecting substrate or fully transmitting substrate respectively is introduced between the two highly reflecting mirrors starting from the first splitting operation.

It has been found out that it is particularly advantageous to provide, parallel to the at least one portion configured to form a full reflector or an antireflector, a compensator layer in order to keep equal dispersion of the reflected and transmitted beams.

An embodiment of the invention wherein the length of the line of focus is halved includes a beam splitter for splitting a beam of light, comprising:

pairs of mirrors, including n pairs of mirrors wherein n is an integer equal to 2 or greater, each of the pairs of mirrors including a first mirror and a second mirror having reflective surfaces disposed opposing one another, the pairs of mirrors being serially disposed relative one another in a downstream transmission direction extending from an input end to an output end, wherein a $1^{st}$ pair of the pairs of mirrors is disposed at the input end and an $n^{th}$ pair of the mirrors is disposed at the output end;

a planar optical substrate having a substrate surface defining a substrate plane disposed between the first mirror and the second mirror of each of the pairs of mirrors, the substrate surface including a first surface portion and a second surface portion arranged adjacent a side of the first surface portion nearest the output end;

the first surface portion being semi-reflecting, permitting partial light transmission through the planar optical substrate and permitting partial light reflection from the planar optical substrate;

the second surface portion being highly transmissive and antireflective permitting light transmission through the planar optical substrate;

the planar optical substrate being movably disposed to move in the substrate plane in an upstream transmission direction from a first position to at least a second position thereby shifting the first surface portion and the second substrate portion relative to the pairs of mirrors;

the first position providing a first relative arrangement of the pairs of mirrors and the planar optical substrate wherein the first surface portion is interposed between the first and second mirrors of the pairs of mirrors to receive and direct light from and to the pairs of mirrors, each of the pairs of mirrors in conjunction with the planar optical substrate defining a mirror pair section such that for each of the mirror pair sections:

at least one input light beam received from a direction of the input end and incident on the first surface portion of the planar optical substrate at an inclination such that the at least one input light beam is split into first and second split portions for each of the at least one input light beam which are then respectively directed to the first and second mirrors; and the first and second split portions for each of the at least one input light beam are respectively reflected by the first and second mirrors of the pair of mirrors and reflected from the mirror pair section as mirror pair section output to be incident on the planar optical substrate at positions which are displaced apart from one another in the downstream transmission direction;

the mirror pair section output from the 1 st through the (n−1)th pair of mirrors are each received as the at least one input light beam of a next adjacent mirror pair section in a direction toward the output end;

the mirror pair section output of the $n^{th}$ pair of mirrors are each received by the first surface portion of the optical substrate as input light beams and split into first and second split portions which are emitted as beam splitter output beams; and the second surface portion is positioned to a downstream transmission side of the $n^{th}$ pair of mirrors and is not incident upon by the mirror pair section output of the $1^{st}$ through $n^{th}$ pairs of mirrors;

the second position providing a second relative arrangement of the pairs of mirrors and the planar optical substrate wherein the first and second surface portions are shifted in an upstream transmission direction, from locations when in the first position, and the second relative arrangement differs from that of the first relative arrangement in that:

the second surface portion replaces the first surface portion in receiving incident thereon the mirror pair section output from the (n+1−m) th pair of mirrors through the $n^{th}$ pair of mirrors, wherein m is an integer in a range from 1 to n, thereby a single transmitted beam replaces each of the first and second split portions resultant from splitting of the mirror pair section output from the (n+1−m) th pair of mirrors through the $n^{th}$ pair of mirrors, thus reducing a number of the beam splitter output beams produced by the first relative arrangement by a factor of $2^m$.

The above described embodiment may further include an arrangement wherein the second position provides the second relative arrangement of the pairs of mirrors and the planar optical substrate such that the first and second surface portions are shifted in the upstream transmission direction such that m equals n and the second relative arrangement further differs from that of the first relative arrangement in that the second surface portion replaces the first surface portion in receiving incident thereon the at least one input light beam of the mirror pair section of the $1^{st}$ pair of mirrors and thereby a single transmitted beam replaces the first and second split portions of the $1^{st}$ pair of mirrors thus reducing a number of the beam splitter output beams produced by the first relative arrangement by a factor of $2^{m+1}$.

Another embodiment of the invention wherein the length of the line of focus is halved includes a beam splitter for splitting a beam of light, comprising:

pairs of mirrors, including n pairs of mirrors wherein n is an integer equal to 2 or greater, each of the pairs of mirrors including a first mirror and a second mirror having reflective surfaces disposed opposing one another, the pairs of mirrors being serially disposed relative one another in a downstream transmission direction extending from an input end to an output end, wherein a $1^{st}$ pair of the pairs of mirrors is disposed at the input end and an $n^{th}$ pair of the mirrors is disposed at the output end;

a planar optical substrate having a substrate surface defining a substrate plane disposed between the first mirror and the second mirror of each of the pairs of mirrors, the substrate surface including a first surface portion and a second surface portion arranged adjacent a side of the first surface portion nearest the output end;

the first surface portion being semi-reflecting, permitting partial light transmission through the planar optical substrate and permitting partial light reflection from the planar optical substrate;

the second surface portion being highly reflective permitting reflection of light incident on opposing sides of the planar optical substrate;

the planar optical substrate being movably disposed to move in the substrate plane in an upstream transmission direction from a first position to at least a second position thereby shifting the first surface portion and the second substrate portion relative to the pairs of mirrors;

the first position providing a first relative arrangement of the pairs of mirrors and the planar optical substrate wherein the first surface portion is interposed between the first and second mirrors of the pairs of mirrors to receive and direct light from and to the pairs of mirrors, each of the pairs of mirrors in conjunction with the planar optical substrate defining a mirror pair section such that for each of the mirror pair sections:

at least one input light beam received from a direction of the input end and incident on the first surface portion of the planar optical substrate at an inclination such that the at least one input light beam is split into first and second split portions which are then respectively directed to the first and second mirrors; and the first and second split portions for each of the at least one input light beam are respectively reflected by the first and second mirrors of the pair of mirrors and reflected from the mirror pair section as mirror pair section output to be incident on the planar optical substrate at positions which are displaced apart from one another in the downstream transmission direction;

the mirror pair section output from the $1^{st}$ through the (n−1)th pair of mirrors are each received as the at least one input light beam of a next adjacent mirror pair section in a direction toward the output end;

the mirror pair section output of the $n^{th}$ pair of mirrors are each received by the first surface portion of the optical substrate as input light beams and split into first and second split portions which are emitted as beam splitter output beams; and the second surface portion is positioned to a downstream transmission side of the $n^{th}$ pair of mirrors and is not incident upon by the mirror pair section output of the $1^{st}$ through $n^{th}$ pairs of mirrors;

the second position providing a second relative arrangement of the pairs of mirrors and the planar optical substrate wherein the first and second surface portions are shifted in the upstream transmission direction, from locations when in the first position, and the second relative arrangement differs from that of the first relative arrangement in that:

the second surface portion replaces the first surface portion in receiving incident thereon the mirror pair section output from the (n+1−m) th pair of mirrors through the $n^{th}$ pair of mirrors, wherein m is an integer in the range from 1 to n, thereby a single reflected beam replaces each of the first and second split portions resultant from splitting of the mirror pair section output from the (n+1−m) th pair of mirrors through the $n^{th}$ pair of mirrors, thus reducing a number of the beam splitter output beams produced by the first relative arrangement by a factor of $2^m$.

The above described embodiment may further include an arrangement wherein the second position provides the second relative arrangement of the pairs of mirrors and the planar optical substrate such that the first and second surface portions are shifted in the upstream transmission direction such that m equals n and the second relative arrangement further differs from that of the first relative arrangement in that the second surface portion replaces the first surface portion in receiving incident thereon the at least one input light beam of the mirror pair section of the $1^{st}$ pair of mirrors and thereby a single reflected beam replaces the first and second split portions of the $1^{st}$ pair of mirrors thus reducing a number of the beam splitter output beams produced by the first relative arrangement by a factor of $2^{m+1}$.

An embodiment of the invention wherein a length between focus points of a line of focus points is increased also includes a beam splitter for splitting a beam of light comprising:

pairs of mirrors, including n pairs of mirrors wherein n is an integer equal to 2 or greater, each of the pairs of mirrors including a first mirror and a second mirror having reflective surfaces disposed opposing one another, the pairs of mirrors being serially disposed relative one another in a downstream transmission direction extending from an input end to an output end, wherein a $1^{st}$ pair of the pairs of mirrors is disposed at the input end and an $n^{th}$ pair of the mirrors is disposed at the output end;

a planar optical substrate having a substrate surface defining a substrate plane disposed between the first mirror and the second mirror of each of the pairs of mirrors, the substrate surface including a first surface portion and a second surface portion arranged adjacent a side of the first surface portion nearest the input end;

the first surface portion being semi-reflecting, permitting partial light transmission through the planar optical substrate and permitting partial light reflection from the planar optical substrate;

the second surface portion being highly transmissive and antireflective permitting light transmission through the planar optical substrate;

the planar optical substrate being movably disposed to move in the substrate plane in the downstream transmission direction from a first position to at least a second position thereby shifting the first surface portion and the second substrate portion relative to the pairs of mirrors;

the first position providing a first relative arrangement of the pairs of mirrors and the planar optical substrate wherein the first surface portion is interposed between the first and second mirrors of the pairs of mirrors to receive and direct light from and to the pairs of mirrors, each of the pairs of mirrors in conjunction with the planar optical substrate defining a mirror pair section such that for each of the mirror pair sections:

at least one input light beam received from a direction of the input end and incident on the first surface portion of the planar optical substrate at an inclination such that the at least one input light beam is split into first and second split portions which are then respectively directed to the first and second mirrors; and the first and second split portions for each of the at least one input light beam are respectively reflected by the first and second mirrors of the pair of mirrors and reflected from the mirror pair section as mirror pair section output to be incident on the planar optical substrate at positions which are displaced apart from one another in the downstream transmission direction;

the mirror pair section output from the $1^{st}$ through the (n−1)th pair of mirrors are each received as the at least one input light beam of a next adjacent mirror pair section in a direction toward the output end;

the mirror pair section output of the $n^{th}$ pair of mirrors are each received by the first surface portion of the optical substrate as input light beams and split into first and second split portions which are emitted as beam splitter output beams; and the second surface portion is positioned to an upstream transmission side of the $1^{st}$ pair of mirrors and is not incident upon by the at least one input beam of the $1^{st}$ through $n^{th}$ pairs of mirrors;

the second position providing a second relative arrangement of the pairs of mirrors and the planar optical substrate wherein the first and second surface portions are shifted in the downstream transmission direction, from locations when in the first position, and the second relative arrangement differs from that of the first relative arrangement in that:

the second surface portion replaces the first surface portion in receiving incident thereon the at least one input beam of the mirror pair sections of the $1^{st}$ through $m^{th}$ pairs of mirrors, wherein m is an integer in the range from 1 to n, thereby a single transmitted beam replaces each of the first and second split portions resultant from splitting of the at least one input beam of the mirror pair sections of the $1^{st}$ through $m^{th}$ pairs of mirrors, thus reducing a number of the beam splitter output beams produced by the first relative arrangement by a factor of $2^m$.

The above described embodiment may further include an arrangement wherein the second position provides the second relative arrangement of the pairs of mirrors and the planar optical substrate such that the first and second surface portions are shifted in the downstream transmission direction such that m equals n and the second relative arrangement further differs from that of the first relative arrangement in that the second surface portion replaces the first surface portion in receiving incident thereon the mirror pair section output of the $n^{th}$ pair of mirrors and thereby a single transmitted beam replaces each pair of the first and second split portions emitted as the beam splitter output beams of the first relative arrangement thus reducing a number of the beam splitter output beams produced by the first relative arrangement by a factor of $2^{m+1}$.

An embodiment of the invention wherein a length between focus points of a line of focus points is increased also includes a beam splitter for splitting a beam of light comprising:

pairs of mirrors, including n pairs of mirrors wherein n is an integer equal to 2 or greater, each of the pairs of mirrors including a first mirror and a second mirror having reflective surfaces disposed opposing one another, the pairs of mirrors being serially disposed relative one another in a downstream transmission direction extending from an input end to an output end, wherein a $1^{st}$ pair of the pairs of mirrors is disposed at the input end and an $n^{th}$ pair of the mirrors is disposed at the output end;

a planar optical substrate having a substrate surface defining a substrate plane disposed between the first mirror and the second mirror of each of the pairs of mirrors, the substrate surface including a first surface portion and a second surface portion arranged adjacent a side of the first surface portion nearest the input end;

the first surface portion being semi-reflecting, permitting partial light transmission through the planar optical substrate and permitting partial light reflection from the planar optical substrate;

the second surface portion being highly reflective permitting reflection of light incident on opposing sides of the planar optical substrate;

the planar optical substrate being movably disposed to move in the substrate plane in a downstream transmission direction from a first position to at least a second position thereby shifting the first surface portion and the second substrate portion relative to the pairs of mirrors;

the first position providing a first relative arrangement of the pairs of mirrors and the planar optical substrate wherein the first surface portion is interposed between the first and second mirrors of the pairs of mirrors to receive and direct light from and to the pairs of mirrors, each of the pairs of mirrors in conjunction with the planar optical substrate defining a mirror pair section such that for each of the mirror pair sections:

at least one input light beam received from a direction of the input end and incident on the first surface portion of the planar optical substrate at an inclination such that the at least one input light beam is split into first and second split portions which are then respectively directed to the first and second mirrors; and the first and second split portions for each of the at least one input light beam are respectively reflected by the first and second mirrors of the pair of mirrors and reflected from the mirror pair section as mirror pair section output to be incident on the planar optical substrate at positions which are displaced apart from one another in the downstream transmission direction;

the mirror pair section output from the $1^{st}$ through the (n–1)th pair of mirrors are each received as the at least one input light beam of a next adjacent mirror pair section in a direction toward the output end;

the mirror pair section output of the $n^{th}$ pair of mirrors are each received by the first surface portion of the optical substrate as input light beams and split into first and second split portions which are emitted as beam splitter output beams; and the second surface portion is positioned to an upstream transmission side of the $1^{st}$ pair of mirrors and is not incident upon by the at least one input beam of the $1^{st}$ through $n^{th}$ pairs of mirrors;

the second position providing a second relative arrangement of the pairs of mirrors and the planar optical substrate wherein the first and second surface portions are shifted in the downstream transmission direction, from locations when in the first position, and the second relative arrangement differs from that of the first relative arrangement in that:

the second surface portion replaces the first surface portion in receiving incident thereon the at least one input beam of the $1^{st}$ pair of mirrors through the m th pair of mirrors, wherein m is an integer in the range from 1 to n, thereby a single reflected beam replaces each of the first and second split portions resultant from splitting of the at least one input beam of the mirror pair sections of the $1^{st}$ through $m^{th}$ pairs of mirrors, thus reducing a number of the beam splitter output beams produced by the first relative arrangement by a factor of $2^m$.

The above described embodiment may further include an arrangement wherein the second position provides the second relative arrangement of the pairs of mirrors and the planar optical substrate such that the first and second surface portions are shifted in the downstream transmission direction such that m equals n and the second relative arrangement further differs from that of the first relative arrangement in the second surface portion replaces the first surface portion in receiving incident thereon the mirror pair section output of the $n^{th}$ pair of mirrors and thereby a single reflected beam replaces each pair of the first and second split portions emitted as the beam splitter output beams of the first relative arrangement thus reducing a number of the beam splitter output beams produced by the first relative arrangement by a factor of $2^{m+1}$.

A further feature of the above noted embodiments includes an arrangement wherein the first mirror and the second mirror of each of the pairs of mirrors are disposed different distances from the substrate surface.

Yet another feature of the above described embodiments includes an arrangement further comprising a compensator layer disposed parallel to the first portion of the planar optical substrate and effecting matching of dispersion of the first and second split portions.

Still another feature of the above embodiments includes an arrangement wherein the first mirror and the second mirror of each of the pairs of mirrors are inclined relative to one another to effect convergence of the beam splitter output beams.

The invention will be explained in closer detail hereinafter by way of example with reference to the drawings.

DETAILED DESCRIPTION OF THE INVENTION

Figure 1:
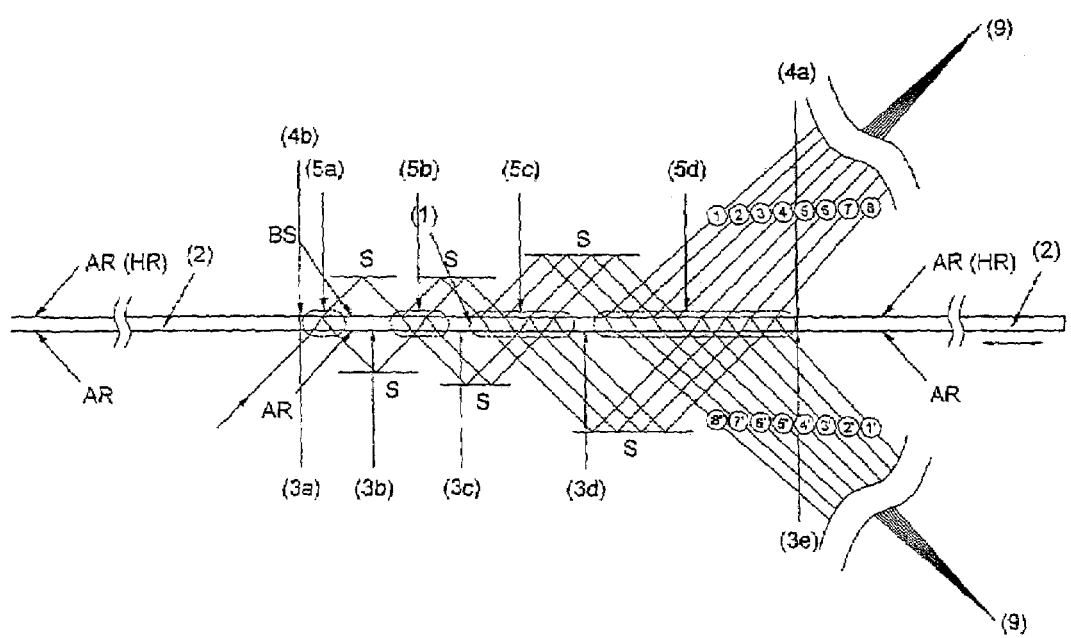
FIG. 1 shows a beam splitter device.

FIG. 1 shows a typical embodiment of the beam splitter. A portion of a beam splitter substrate that splits the beam in two is indicated at 1 and is spaced different distances from highly reflecting mirrors S of each pair of mirrors S. An antireflecting AR or a highly reflecting HR portion 2 borders on either side thereof. Insertion positions 3a–e to which transitions 4a and 4b, between portions of the beam splitter, may be displaced are located between the splitting points 5a–d. At first, an entering laser beam is split in two beams at splitting point 5a. These two beams are reflected off the two first highly reflecting mirrors S and are directed back to the beam splitter substrate 1 which they reach at displace positions at splitting point 5b. There, four partial beams are obtained from the two partial beams. At the following splitting points 5c and 5d, eight and sixteen partial beams respectively are obtained. The beams converging at intersection points 9 of the partial beams when the highly reflecting mirrors S are inclined to one another at the proper angle. All in all, the beam bundle yields two beam bundles consisting of the beams 1–8 and 1'–8'.

Figure 2:
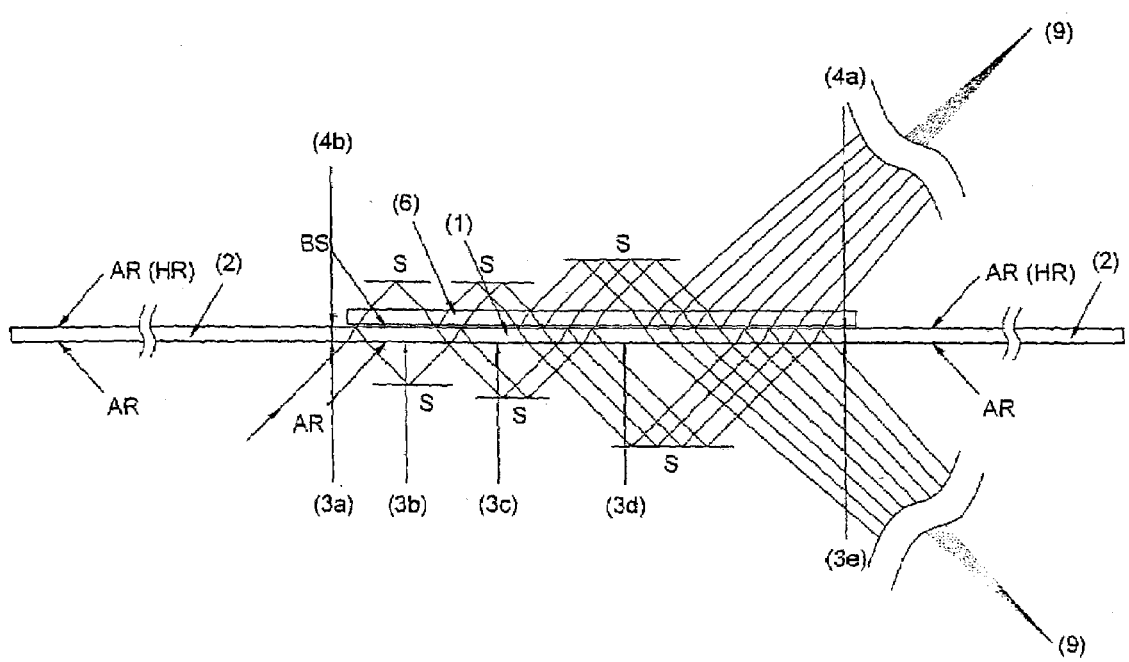
FIG. 2 shows a beam splitter device with a correction plate.

FIG. 2 shows another improved embodiment of the beam splitter. In addition to the beam splitting substrate 1, a correction plate 6, which acts as a compensator layer, is mounted in this beam splitter. Said correction plate has the same thickness as the beam splitting substrate. If the beam splitter is used for splitting an ultra-short pulse laser beam, the correction plate causes each partial beam to travel the same distance in the glass. As a result thereof, dispersion is the same for all of the partial beams. The advantage thereof is that after splitting the discrete partial beams have the same properties.

Figure 3:
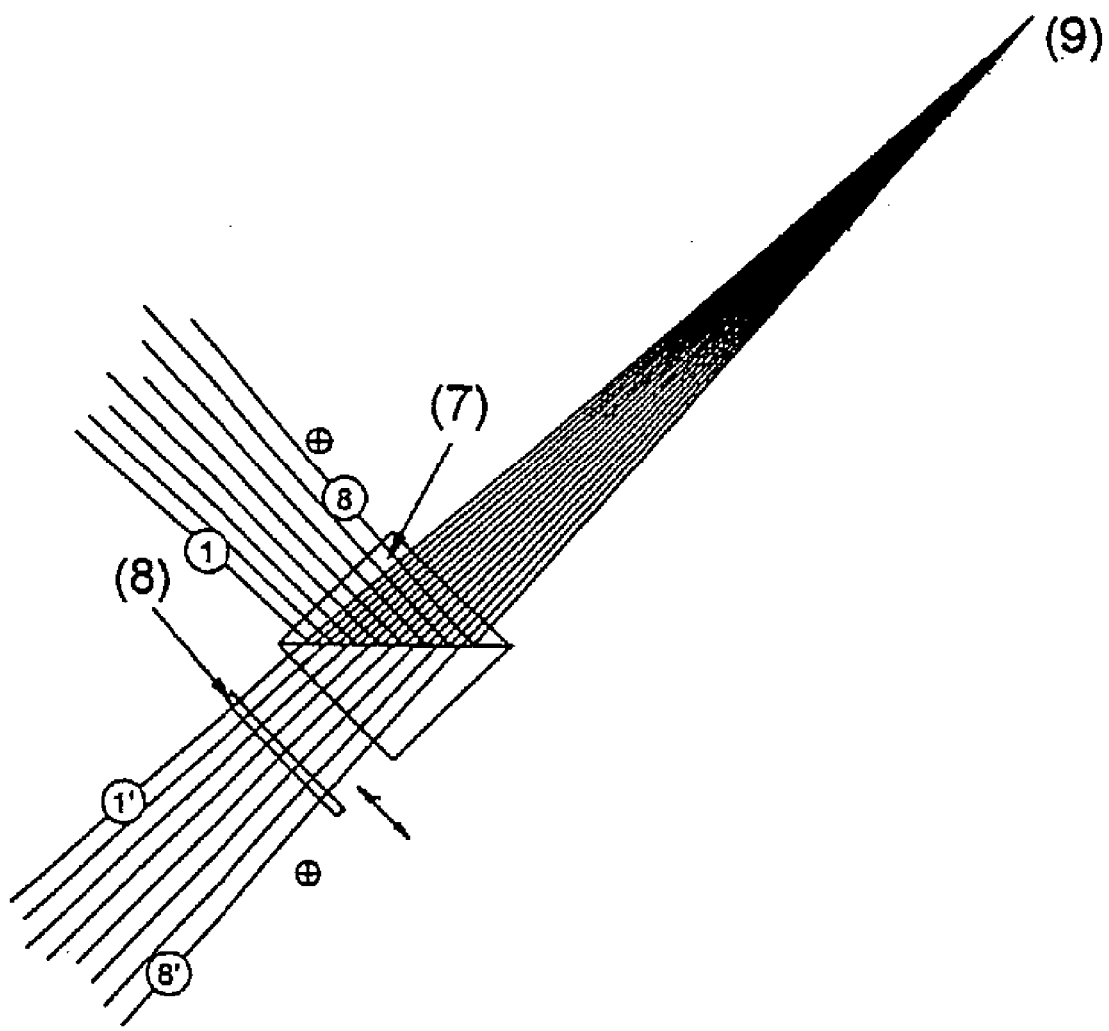
FIG. 3 shows portions of beam bundles grouped into one combined bundle.

FIG. 3 shows how the two partial beams may be grouped into one single beam bundle after splitting. For this purpose, the polarization of the beams of a beam bundle is rotated 90.degree. in a polarization-rotating half-wave plate 8. Then, the two beam bundles are coupled to one beam bundle in a polarization coupler 7. After coupling, the sequence of the discrete beams is 1'; 1; 2'; 2 . . . ; 7'; 7; 8', 8.

Figure 4:
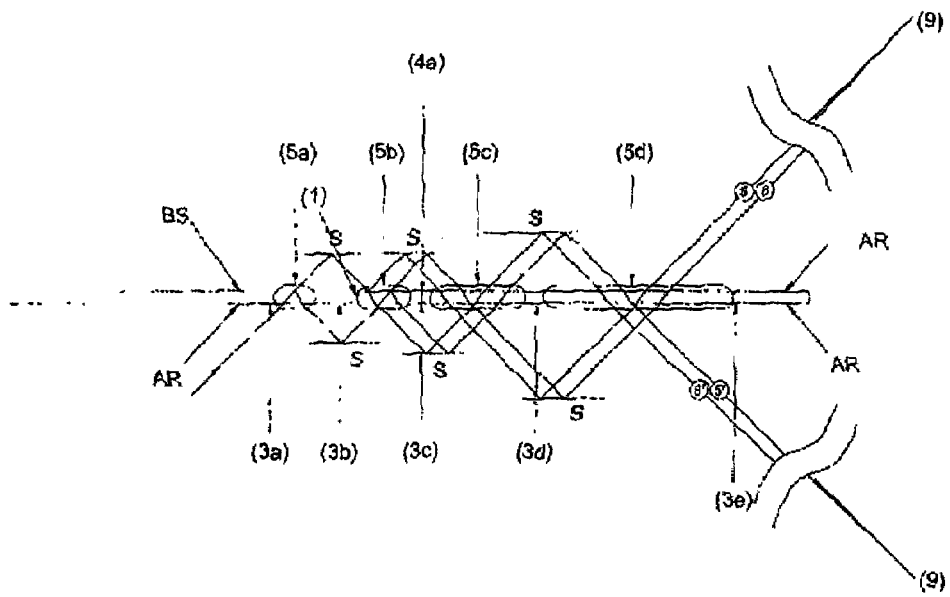
FIG. 4 shows a listing of beams when the laser beam according to the FIGS. 1 and 2 is split, the beams being subsequently grouped together (FIG. 3).

FIG. 4 shows a list of the beams obtained when the laser beam according to the FIGS. 1 and 2 respectively is split and when the two beam bundles according to FIG. 3 are grouped into one single bundle. The table shows two cases regarding antireflecting (AR) portions 2 of the beam splitter substrate. Those beams are listed that are obtained when a) the transition 4a between the portions of the beam splitter is located at the various insertion positions 3a–e or when b) the transition 4b between the portions of the beam splitter is located at the positions 3a–e. Accordingly, the two parts of the table show the insertion being performed from the side of the last splitting point 5d on the one hand and from the side of the first splitting point 5a on the other hand. If, by means of a lens or an objective, a line of foci is now produced from the beam bundle, the length of the line is gradually reduced by half in the case a), the number of beams being halved thereby, whereas in case b) the number of beams is also gradually reduced by a factor of 2 but the spacing between the foci is increased. If, for the insertion positions shown in case b), the spacings between the foci are to be exactly identical, the coupling of the beam bundles as shown in FIG. 3 must be slightly readjusted for each position of insertion.

Figure 5:
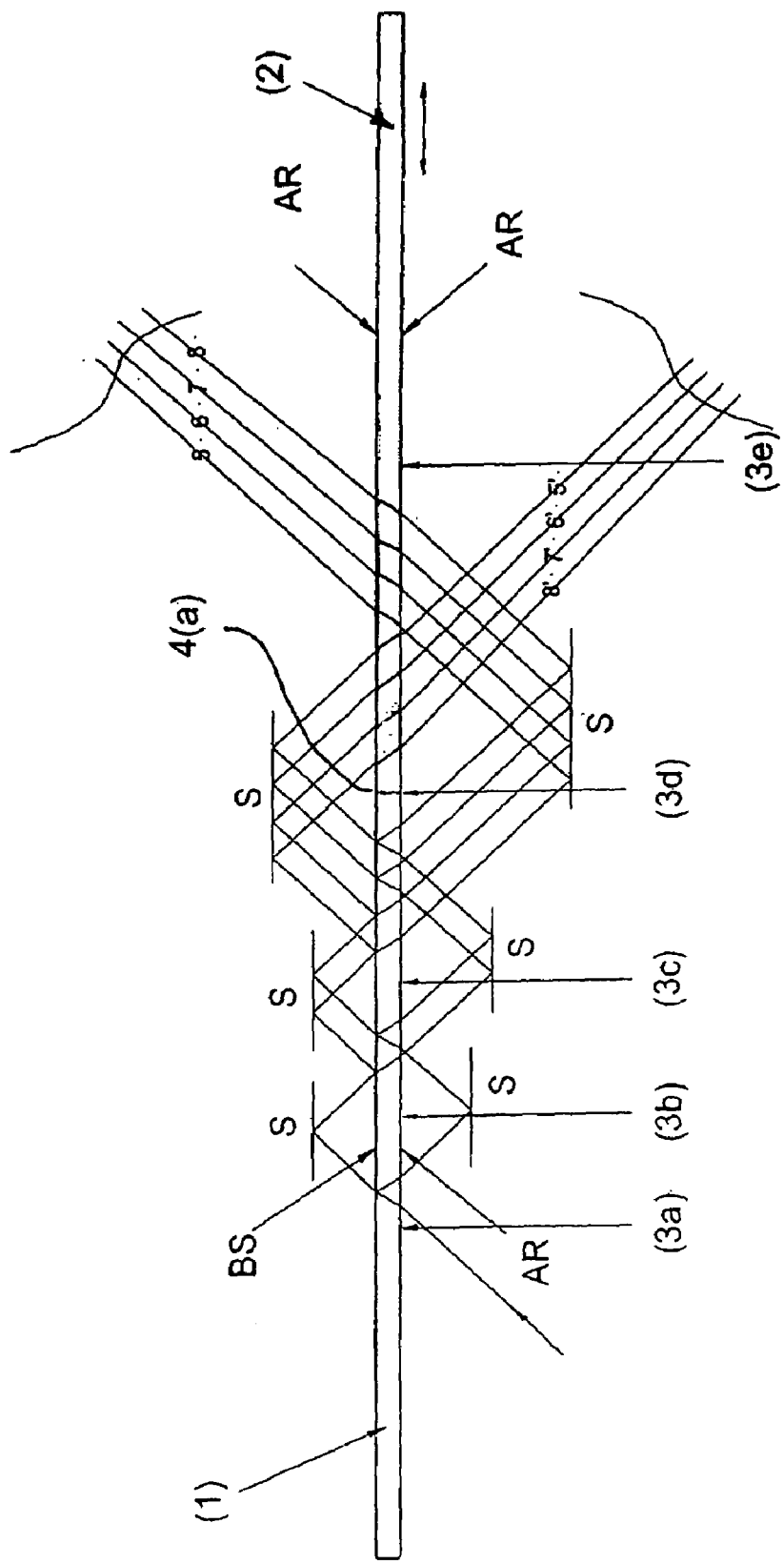
FIG. 5 shows an embodiment of the present invention wherein a beam splitter substrate is inserted in an upstream direction to advance a transition position 4a of the beam splitter substrate to insertion position 3d to produce the beams recited in a table entry of the listing of FIG. 3.

Referring to FIG. 5, an example is shown of a situation wherein the transition 4a is inserted from the side of the last splitting point 5d to the insertion position 3d. In accordance with line 4a-3d of the Table 1 of FIG. 3, beams 5, 5', 6, 6', 7, 7', 8 and 8' are produced.

I claim:

1. A beam splitter for splitting a beam of light, comprising:
  pairs of mirrors, including n pairs of mirrors wherein n is an integer equal to 2 or greater, each of said pairs of mirrors including a first mirror and a second mirror having reflective surfaces disposed opposing one another, said pairs of mirrors being serially disposed relative one another in a downstream transmission direction extending from an input end to an output end, wherein a $1^{st}$ pair of said pairs of mirrors is disposed at said input end and an $n^{th}$ pair of said mirrors is disposed at said output end;
  a planar optical substrate having a substrate surface defining a substrate plane disposed between said first mirror and said second mirror of each of said pairs of mirrors, said substrate surface including a first surface portion and a second surface portion arranged adjacent a side of said first surface portion nearest said output end;
  said first surface portion being semi-reflecting, permitting partial light transmission through said planar optical substrate and permitting partial light reflection from said planar optical substrate;
  said second surface portion being highly transmissive and antireflective permitting light transmission through said planar optical substrate;
  said planar optical substrate being movably disposed to move in said substrate plane in an upstream transmission direction from a first position to at least a second position thereby shifting said first surface portion and said second substrate portion relative to said pairs of mirrors;
  said first position providing a first relative arrangement of said pairs of mirrors and said planar optical substrate wherein said first surface portion is interposed between said first and second mirrors of said pairs of mirrors to receive and direct light from and to said pairs of mirrors, each of said pairs of mirrors in conjunction with said planar optical substrate defining a mirror pair section such that for each of said mirror pair sections:
    at least one input light beam received from a direction of said input end and incident on said first surface portion of said planar optical substrate at an inclination such that said at least one input light beam is split into first and second split portions for each of said at least one input light beam which are then respectively directed to said first and second mirrors; and
    said first and second split portions for each of said at least one input light beam are respectively reflected by said first and second mirrors of said pair of mirrors and reflected from said mirror pair section as mirror pair section output to be incident on said planar optical substrate at positions which are displaced apart from one another in said downstream transmission direction;
  said mirror pair section output from said $1^{st}$ through said (n−1)th pair of mirrors are each received as said at least one input light beam of a next adjacent mirror pair section in a direction toward said output end;
  said mirror pair section output of said $n^{th}$ pair of mirrors are each received by said first surface portion of said optical substrate as input light beams and split into first and second split portions which are emitted as beam splitter output beams; and
  said second surface portion is positioned to a downstream transmission side of said $n^{th}$ pair of mirrors and is not incident upon by said mirror pair section output of said $1^{st}$ through $n^{th}$ pairs of mirrors;
  said second position providing a second relative arrangement of said pairs of mirrors and said planar optical substrate wherein said first and second surface portions are shifted in an upstream transmission direction, from locations when in said first position, and said second relative arrangement differs from that of said first relative arrangement in that:
  said second surface portion replaces said first surface portion in receiving incident thereon said mirror pair section output from said (n+1−m) th pair of mirrors through said $n^{th}$ pair of mirrors, wherein m is an integer in a range from 1 to n, thereby a single transmitted beam replaces each of said first and second split portions resultant from splitting of said mirror pair section output from said (n+1−m) th pair of mirrors through said $n^{th}$ pair of mirrors, thus reducing a number of said beam splitter output beams produced by said first relative arrangement by a factor of $2^m$.

2. The beam splitter according to claim 1, wherein m is an integer variable in the range from 1 to n.

3. The beam splitter according to claim 2, wherein said second position provides the second relative arrangement of said pairs of mirrors and said planar optical substrate such that said first and second surface portions are shifted in the upstream transmission direction such that m equals n and said second relative arrangement further differs from that of said first relative arrangement in that said second surface portion replaces said first surface portion in receiving incident thereon said at least one input light beam of said mirror pair section of said $1^{st}$ pair of mirrors and thereby a single transmitted beam replaces said first and second split portions of said $1^{st}$ pair of mirrors thus reducing a number of said beam splitter output beams produced by said first relative arrangement by a factor of $2^{m+1}$.

4. The beam splitter according to claim 3, wherein said first mirror and said second mirror of each of said pairs of mirrors are disposed different distances from said substrate surface.

5. The beam splitter according to claim 1, further comprising
a compensator layer disposed parallel to said first portion of said planar optical substrate and effecting matching of dispersion of said first and second split portions.

6. The beam splitter according to claim 1, wherein said first mirror and said second mirror of each of said pairs of mirrors are inclined relative to one another to effect convergence of said beam splitter output beams.

7. A beam splitter for splitting a beam of light, comprising:
pairs of mirrors, including n pairs of mirrors wherein n is an integer equal to 2 or greater, each of said pairs of mirrors including a first mirror and a second mirror having reflective surfaces disposed opposing one another, said pairs of mirrors being serially disposed relative one another in a downstream transmission direction extending from an input end to an output end, wherein a $1^{st}$ pair of said pairs of mirrors is disposed at said input end and an $n^{th}$ pair of said mirrors is disposed at said output end;
a planar optical substrate having a substrate surface defining a substrate plane disposed between said first mirror and said second mirror of each of said pairs of mirrors, said substrate surface including a first surface portion and a second surface portion arranged adjacent a side of said first surface portion nearest said input end;
said first surface portion being semi-reflecting, permitting partial light transmission through said planar optical substrate and permitting partial light reflection from said planar optical substrate;
said second surface portion being highly transmissive and antireflective permitting light transmission through said planar optical substrate;
said planar optical substrate being movably disposed to move in said substrate plane in the downstream transmission direction from a first position to at least a second position thereby shifting said first surface portion and said second substrate portion relative to said pairs of mirrors;
said first position providing a first relative arrangement of said pairs of mirrors and said planar optical substrate wherein said first surface portion is interposed between said first and second mirrors of said pairs of mirrors to receive and direct light from and to said pairs of mirrors, each of said pairs of mirrors in conjunction with said planar optical substrate defining a mirror pair section such that for each of said mirror pair sections:
at least one input light beam received from a direction of said input end and incident on said first surface portion of said planar optical substrate at an inclination such that said at least one input light beam is split into first and second split portions which are then respectively directed to said first and second mirrors; and
said first and second split portions for each of said at least one input light beam are respectively reflected by said first and second mirrors of said pair of mirrors and reflected from said mirror pair section as mirror pair section output to be incident on said planar optical substrate at positions which are displaced apart from one another in said downstream transmission direction;
said mirror pair section output from said $1^{st}$ through said (n−1)th pair of mirrors are each received as said at least one input light beam of a next adjacent mirror pair section in a direction toward said output end;
said mirror pair section output of said $n^{th}$ pair of mirrors are each received by said first surface portion of said optical substrate as input light beams and split into first and second split portions which are emitted as beam splitter output beams; and
said second surface portion is positioned to an upstream transmission side of said $1^{st}$ pair of mirrors and is not incident upon by said at least one input beam of said $1^{st}$ through $n^{th}$ pairs of mirrors;
said second position providing a second relative arrangement of said pairs of mirrors and said planar optical substrate wherein said first and second surface portions are shifted in the downstream transmission direction, from locations when in said first position, and said second relative arrangement differs from that of said first relative arrangement in that:
said second surface portion replaces said first surface portion in receiving incident thereon said at least one input beam of said mirror pair sections of said $1^{st}$ through $m^{th}$ pairs of mirrors, wherein m is an integer in the range from 1 to n, thereby a single transmitted beam replaces each of said first and second split portions resultant from splitting of said at least one input beam of said mirror pair sections of said $1^{st}$ through $m^{th}$ pairs of mirrors, thus reducing a number of said beam splitter output beams produced by said first relative arrangement by a factor of $2^m$.

8. The beam splitter according to claim 7, wherein m is an integer variable in the range from 1 to n.

9. The beam splitter according to claim 8, wherein said second position provides the second relative arrangement of said pairs of mirrors and said planar optical substrate such that said first and second surface portions are shifted in the downstream transmission direction such that m equals n and said second relative arrangement further differs from that of said first relative arrangement in that said second surface portion replaces said first surface portion in receiving incident thereon said mirror pair section output of said $n^{th}$ pair of mirrors and thereby a single transmitted beam replaces each pair of said first and second split portions emitted as the beam splitter output beams of said first relative arrangement thus reducing a number of said beam splitter output beams produced by said first relative arrangement by a factor of $2^{m+1}$.

10. The beam splitter according to claim 9, wherein said first mirror and said second mirror of each of said pairs of mirrors are disposed different distances from said substrate surface.

11. The beam splitter according to claim 7, further comprising
a compensator layer disposed parallel to said first portion of said planar optical substrate and effecting matching of dispersion of said first and second split portions.

12. The beam splitter according to claim 7, wherein said first mirror and said second mirror of each of said pairs of mirrors are inclined relative to one another to effect convergence of said beam splitter output beams.

13. A beam splitter for splitting a beam of light, comprising:
pairs of mirrors, including n pairs of mirrors wherein n is an integer equal to 2 or greater, each of said pairs of mirrors including a first mirror and a second mirror having reflective surfaces disposed opposing one another, said pairs of mirrors being serially disposed relative one another in a downstream transmission direction extending from an input end to an output end, wherein a $1^{st}$ pair of said pairs of mirrors is disposed at said input end and an $n^{th}$ pair of said mirrors is disposed at said output end;
a planar optical substrate having a substrate surface defining a substrate plane disposed between said first mirror and said second mirror of each of said pairs of mirrors, said substrate surface including a first surface portion and a second surface portion arranged adjacent a side of said first surface portion nearest said output end;
said first surface portion being semi-reflecting, permitting partial light transmission through said planar optical substrate and permitting partial light reflection from said planar optical substrate;
said second surface portion being highly reflective permitting reflection of light incident on opposing sides of said planar optical substrate;
said planar optical substrate being movably disposed to move in said substrate plane in an upstream transmission direction from a first position to at least a second position thereby shifting said first surface portion and said second substrate portion relative to said pairs of mirrors;
said first position providing a first relative arrangement of said pairs of mirrors and said planar optical substrate wherein said first surface portion is interposed between said first and second mirrors of said pairs of mirrors to receive and direct light from and to said pairs of mirrors, each of said pairs of mirrors in conjunction with said planar optical substrate defining a mirror pair section such that for each of said mirror pair sections:
at least one input light beam received from a direction of said input end and incident on said first surface portion of said planar optical substrate at an inclination such that said at least one input light beam is split into first and second split portions which are then respectively directed to said first and second mirrors; and
said first and second split portions for each of said at least one input light beam are respectively reflected by said first and second mirrors of said pair of mirrors and reflected from said mirror pair section as mirror pair section output to be incident on said planar optical substrate at positions which are displaced apart from one another in said downstream transmission direction;
said mirror pair section output from said $1^{st}$ through said (n−1)th pair of mirrors are each received as said at least one input light beam of a next adjacent mirror pair section in a direction toward said output end;
said mirror pair section output of said $n^{th}$ pair of mirrors are each received by said first surface portion of said optical substrate as input light beams and split into first and second split portions which are emitted as beam splitter output beams; and
said second surface portion is positioned to a downstream transmission side of said $n^{th}$ pair of mirrors and is not incident upon by said mirror pair section output of said $1^{st}$ through $n^{th}$ pairs of mirrors;
said second position providing a second relative arrangement of said pairs of mirrors and said planar optical substrate wherein said first and second surface portions are shifted in the upstream transmission direction, from locations when in said first position, and said second relative arrangement differs from that of said first relative arrangement in that:
said second surface portion replaces said first surface portion in receiving incident thereon said mirror pair section output from said (n+1−m)th pair of mirrors through said $n^{th}$ pair of mirrors, wherein m is an integer in the range from 1 to n, thereby a single reflected beam replaces each of said first and second split portions resultant from splitting of said mirror pair section output from said (n+1−m) th pair of mirrors through said $n^{th}$ pair of mirrors, thus reducing a number of said beam splitter output beams produced by said first relative arrangement by a factor of $2^m$.

14. The beam splitter according to claim 13, wherein m is an integer variable in the range from 1 to n.

15. The beam splitter according to claim 14, wherein said second position provides the second relative arrangement of said pairs of mirrors and said planar optical substrate such that said first and second surface portions are shifted in the upstream transmission direction such that m equals n and said second relative arrangement further differs from that of said first relative arrangement in that said second surface portion replaces said first surface portion in receiving incident thereon said at least one input light beam of said mirror pair section of said $1^{st}$ pair of mirrors and thereby a single reflected beam replaces said first and second split portions of said $1^{st}$ pair of mirrors thus reducing a number of said beam splitter output beams produced by said first relative arrangement by a factor of $2^{m+1}$.

16. The beam splitter according to claim 15, wherein said first mirror and said second mirror of each of said pairs of mirrors are disposed different distances from said substrate surface.

17. The beam splitter according to claim 13, further comprising
a compensator layer disposed parallel to said first portion of said planar optical substrate and effecting matching of dispersion of said first and second split portions.

18. The beam splitter according to claim 13, wherein said first mirror and said second mirror of each of said pairs of mirrors are inclined relative to one another to effect convergence of said beam splitter output beams.

19. A beam splitter for splitting a beam of light, comprising:
  pairs of mirrors, including n pairs of mirrors wherein n is an integer equal to 2 or greater, each of said pairs of mirrors including a first mirror and a second mirror having reflective surfaces disposed opposing one another, said pairs of mirrors being serially disposed relative one another in a downstream transmission direction extending from an input end to an output end, wherein a $1^{st}$ pair of said pairs of mirrors is disposed at said input end and an $n^{th}$ pair of said mirrors is disposed at said output end;
  a planar optical substrate having a substrate surface defining a substrate plane disposed between said first mirror and said second mirror of each of said pairs of mirrors, said substrate surface including a first surface portion and a second surface portion arranged adjacent a side of said first surface portion nearest said input end;
  said first surface portion being semi-reflecting, permitting partial light transmission through said planar optical substrate and permitting partial light reflection from said planar optical substrate;
  said second surface portion being highly reflective permitting reflection of light incident on opposing sides of said planar optical substrate;
  said planar optical substrate being movably disposed to move in said substrate plane in a downstream transmission direction from a first position to at least a second position thereby shifting said first surface portion and said second substrate portion relative to said pairs of mirrors;
  said first position providing a first relative arrangement of said pairs of mirrors and said planar optical substrate wherein said first surface portion is interposed between said first and second mirrors of said pairs of mirrors to receive and direct light from and to said pairs of mirrors, each of said pairs of mirrors in conjunction with said planar optical substrate defining a mirror pair section such that for each of said mirror pair sections:
    at least one input light beam received from a direction of said input end and incident on said first surface portion of said planar optical substrate at an inclination such that said at least one input light beam is split into first and second split portions which are then respectively directed to said first and second mirrors; and
    said first and second split portions for each of said at least one input light beam are respectively reflected by said first and second mirrors of said pair of mirrors and reflected from said mirror pair section as mirror pair section output to be incident on said planar optical substrate at positions which are displaced apart from one another in said downstream transmission direction;
  said mirror pair section output from said $1^{st}$ through said (n−1)th pair of mirrors are each received as said at least one input light beam of a next adjacent mirror pair section in a direction toward said output end;
  said mirror pair section output of said $n^{th}$ pair of mirrors are each received by said first surface portion of said optical substrate as input light beams and split into first and second split portions which are emitted as beam splitter output beams; and
  said second surface portion is positioned to an upstream transmission side of said $1^{st}$ pair of mirrors and is not incident upon by said at least one input beam of said $1^{st}$ through $n^{th}$ pairs of mirrors;
  said second position providing a second relative arrangement of said pairs of mirrors and said planar optical substrate wherein said first and second surface portions are shifted in the downstream transmission direction, from locations when in said first position, and said second relative arrangement differs from that of said first relative arrangement in that:
    said second surface portion replaces said first surface portion in receiving incident thereon said at least one input beam of said $1^{st}$ pair of mirrors through said m th pair of mirrors, wherein m is an integer in the range from 1 to n, thereby a single reflected beam replaces each of said first and second split portions resultant from splitting of said at least one input beam of said mirror pair sections of said $1^{st}$ through $m^{th}$ pairs of mirrors, thus reducing a number of said beam splitter output beams produced by said first relative arrangement by a factor of $2^m$.

20. The beam splitter according to claim 19, wherein m is an integer variable in the range from 1 to n.

21. The beam splitter according to claim 20, wherein said second position provides the second relative arrangement of said pairs of mirrors and said planar optical substrate such that said first and second surface portions are shifted in the downstream transmission direction such that m equals n and said second relative arrangement further differs from that of said first relative arrangement in that said second surface portion replaces said first surface portion in receiving incident thereon said mirror pair section output of said $n^{th}$ pair of mirrors and thereby a single reflected beam replaces each pair of said first and second split portions emitted as the beam splitter output beams of said first relative arrangement thus reducing a number of said beam splitter output beams produced by said first relative arrangement by a factor of $2^{m+1}$.

22. The beam splitter according to claim 21, wherein said first mirror and said second mirror of each of said pairs of mirrors are disposed different distances from said substrate surface.

23. The beam splitter according to claim 19, further comprising
  a compensator layer disposed parallel to said first portion of said planar optical substrate and effecting matching of dispersion of said first and second split portions.

24. The beam splitter according to claim 19, wherein said first mirror and said second mirror of each of said pairs of mirrors are inclined relative to one another to effect convergence of said beam splitter output beams.

* * * * *